United States Patent Office 3,631,032
Patented Dec. 28, 1971

3,631,032
3-ALKOXYMETHYLENOXY ETHERS OF PREGNANES AND 19-NORPREGNANES AND THEIR PREPARATION
John H. Fried, Palo Alto, Calif., assignor to Syntex Corporation, Panama, Panama
No Drawing. Filed Apr. 16, 1969, Ser. No. 816,828
Int. Cl. C07c 173/00
U.S. Cl. 260—239.55 D   14 Claims

ABSTRACT OF THE DISCLOSURE

This discloses 3-alkoxymethylenoxy ethers of the pregnane and 19-norpregnane series of steroids wherein the the alkoxy portion has from 1 to 4 carbon atoms, inclusive. The remainder of the pregnane or 19-norpregnane steroid molecule can be substituted and/or unsaturated at one or more of positions C–6, 7, C–10, C–16, and C–17α. These compounds are useful are progestational agents. Also taught are methods useful for the preparation of these compounds.

---

The present invention relates to new and useful steroid ethers. It more specifically pertains to novel and useful 3-alkoxymethyleneoxy steroids of the pregnane and 19-norpregnane series, including various molecularly modified derivatives thereof, the steroid nucleus thus bearing at the C–3 position a novel group represented by the following Formula A:

$$ROCH_2O—$$

(A)

wherein R is an alkyl group containing from 1 to 4 carbon atoms, inclusive.

The novel 3-alkoxymethylenoxy ethers in the pregnane and 19-norpregnane series of the present invention are represented by the following Formula I:

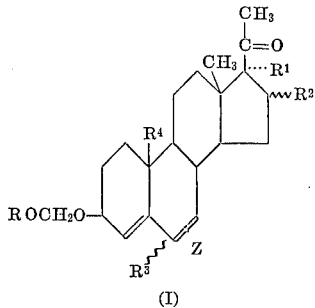

(I)

In Formula I and succeeding formulas,

R is an alkyl group containing from 1 to 4 carbon atoms, inclusive;

$R^1$ is hydrogen, hydroxy or a carboxylic acyloxy group of less than 12 carbon atoms;

$R^2$ is hydrogen, methylene, α-methyl, β-methyl, α-chloro, α-fluoro, α-hydroxy, α-carboxylic acyloxy of less than 12 carbon atoms or, when taken together with $R^1$, the group

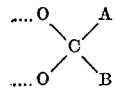

in which A is hydrogen or alkyl of up to 8 carbon atoms and B is hydrogen or alkyl or aryl of up to 8 carbon atoms;

$R^3$ is hydrogen, chloro, fluoro, or methyl;

$R^4$ is hydrogen or methyl; and

Z is a carbon-carbon single bond or a carbon-carbon double bond or the group

in which each of X and Y is hydrogen, chloro, or fluoro.

In the present specification and claims, the expression "alkyl" denotes saturated aliphatic hydrocarbon radicals containing the indicated number of carbon atoms and including all isomeric forms such as methyl, ethyl, n-propyl, isopropyl, n-butyl, isobutyl, sec-butyl, and t-butyl. The terms "carboxylic acyl" and "carboxylic acyloxy" define acyl and acyloxy groups which are derived from a substituted or unsubstituted carboxylic acid. These acids can be completely saturated or they can possess varying degrees of unsaturation (including aromatic), can be of straight-chain, branched-chain, or cyclic structure, and preferably contain from 1 to 12 carbon atoms. In addition, they can be substituted by functional groups, for example, hydroxy, alkoxy containing up to 6 carbon atoms, acyloxy containing up to 12 carbon atoms, nitro, amino, halogen, and the like. Typical carboxylic acid esters under these definitions thus include acetate, propionate, butyrate, valerate, caproate, enanthate, caprylate, pelargonate, acrylate, undecenoate, phenoxyacetate, benzoate, phenylacetate, diphenylacetate, diethylacetate, trimethylacetate, t-butylacetate, trimethylhexanoate, methylneopentylacetate, cyclohexylacetate, cyclopentylpropionate, adamantoate, glycolate, methoxyacetate, hemisuccinate, hemiadipate, hemi-β,β-dimethylglutarate, acetoxyacetate, 2-chloro-4-nitrobenzoate, aminoacetate, diethylaminoacetate, piperidinoacetate, β-chloropropionate, trichloroacetate, bicyclo[2.2.2]-octane-1'-carboxylate, 4-methylbicyclo[2.2.2]oct-2'-en-1'-carboxylate, and the like.

The compounds of the present invention, as depicted by Formula I above are progestational agents. They are accordingly useful in fertility control, in the treatment of premenstral tension and in lowering blood cholesterol levels. In accordance with these utilities the compounds of the present invention are employed in the same manner as compounds having similar properties such as progesterone, chlormadinone acetate, and so forth. These compounds can be administered via the usual routes, whether orally or parenterally, either singly or in conjunction with other medicinal agents, or in pharmaceutically acceptable non-toxic compositions formed by the incorporation of any of the normally employed excipients.

The compounds of the present invention are prepared by reacting together a 3β-hydroxy steroid, otherwise corresponding to the compound depicted by Formula I above, and a chloromethyl alkyl ether, wherein the alkyl group contains from 1 to 4 carbon atoms, and a tertiary amine. This reaction is further conducted at temperatures ranging from about 60° C. up to and preferably at the boiling point of the mixture and under reflux and for a period of time sufficient to complete the reaction. The choice of chloromethyl alkyl ether is made depending upon the final product desired, as depicted by group R. Suitable tertiary amines include the trialkyl amines, such as trimethylamine, triethylamine, tributylamine, and so forth, and the cyclic amines such as collidine, pyridine, lutidine and so forth and, generally, those which have a boiling point of at least about 60° C.

The reaction is optionally performed under an atmosphere which is inert to the reactants such as argon and nitrogen. Also, the reaction can optionally be performed under anhydrous or substantially anhydrous conditions. However, while these conditions may under the most favorable circumstances be preferred, they are not an absolute necessity for the practice of the present invention.

In carrying out this reaction, the 3β-hydroxy starting steroid, chloromethyl alkyl ether, and tertiary amine, are mixed and maintained together in any convenient order or fashion. The reaction mixture is then maintained within the given temperature range for a period of time sufficient to complete the reaction. Upon the completion of the reaction, the reaction mixture is processed via conventional procedures, such as chromatography, decantation, filtration, distillation, evaporation, and so forth to recover and isolate the desired product.

The given reaction consumes the respective reactants in the ratio of one mole of 3β-hydroxy starting steroid per mole of chloromethyl alkyl ether per mole of tertiary amine. However, the amount of reactants to be employed are not critical, some of the desired product being obtained when employing any proportions thereof. In the preferred embodiments hereof, the tertiary amine is employed in amounts sufficient so as to be useful also as a liquid reaction medium or solvent for the reaction. The chloromethyl alkyl ether is preferably employed in amounts ranging from 3 to 50 moles per mole of starting 3β-hydroxy starting steroid or in amounts sufficient so as to be useful also as a co-solvent for the reaction.

The starting 3β-hydroxy compounds of the present invention are known or can be prepared in accordance with the procedures which are known and standard in the art. Thus, they can be prepared from the corresponding 3-oxo derivatives by reduction of the oxo group such as with sodium borohydride in methanol or dioxane or with lithium aluminum hydride in tetrahydrofuran or with lithium aluminum-t-butoxide in tetrahydrofuran. Representative starting compounds and processes for the preparation thereof can be found in, for example, U.S. Pat. 3,338,928.

Representative starting compounds include the following:

pregn-4-ene-3β,16α,17α-triol-20-one,
17α-heptanoyloxy-19-norpregna-4,6-dien-3β-ol-20-one,
16α,17α-diacetoxypregn-4-en-3β-ol-20-one.
6-methyl-16α,17α-dibenzoyloxy-19-norpregn-4-
en-3β-ol-20-one,
6-fluoropregna-4,6-diene-3β,16α,17α-triol-20-one, and
16α,17α-(2,2-butylidenedioxy)pregn-4-en-3β-ol-20-one.

The chloromethyl alkyl ether reactants are known compounds and can be prepared in accordance with known methods, vide Wagner and Zook, Synthetic Organic Chemistry, John Wiley and Sons, Inc., New York, 1953 (1963), especially pages 99 and 100 and 226 et seq.

The following examples serve to typify further the manner by which the present invention may be practiced but, as such, should not be construed as limitations upon the overall scope hereof.

EXAMPLE 1

A solution of 200 mg. of 6-chloro-17α-acetoxypregna-4,6 - diene - 3,20 - dione in 32 ml. of anhydrous isopropanol and 25 mg. of sodium borohydride is stirred at room temperature for 15 hours. One-hundred ml. of water is added and the resulting suspension extracted several times with ether. The ether phase is dried over sodium sulfate and evaporated to dryness under reduced pressure to yield 6-chloro - 17α - acetoxypregna-4,6-dien-3β-ol-20-one which may be further purified by recrystallization from ether.

In like matter, the other 3β-hydroxy compounds, useful as starting materials as herein described, are prepared from the corresponding known 3-oxo derivatives.

EXAMPLE 2

A steroidal solution is prepared by dispersing one gram of 6-chloro - 17α - acetoxypregna - 4,6 - dien - 3β - ol-20-one in 50 ml. of anhydrous collidine at room temperature. To the resulting solution are added 5 ml. of chloromethyl methyl ether portionwise with stirring and at 5° C. under a nitrogen atmosphere. Following the addition, the temperature of the resulting mixture is raised to its boiling point and maintained under reflux for a period of 10 hours. After this time, the reaction mixture is poured into water and the aqueous mixture extracted with ethyl acetate. The ethyl acetate extracts are washed with water and then dried with sodium sulfate. The dried extracts are evaporated to dryness and the residue chromatographed on alumina to obtain the 3β-methoxymethylenoxy - 6 - chloro-17α-acetoxypregna-4,6-dien-20-one product.

EXAMPLE 3

A solution of 10 grams of 6 - chloro - 16 - methylene-17α - acetoxypregna - 4,6 - dien - 3β - ol - 20 - one dispersed in 150 ml. of anhydrous pyridine is prepared. To this solution is added 200 ml. of chloromethyl ethyl ether. This addition is conducted in a portion-wise manner while maintaining the entire mixture at 5° C. and under a nitrogen atmosphere. The resulting reaction mixture is heated to the boiling point and maintained at reflux temperature, under a nitrogen atmosphere, for 18 hours. After this time, the reaction mixture is poured into water and the aqueous mixture extracted with ethyl acetate. The ethyl acetate extracts, after washing them with water, are dried over anhydrous sodium sulfate and evaporated to dryness. The residue is chromatographed on alumina to provide the 3β - ethoxymethylenoxy-6-chloro - 16 - methylene - 17α - acetoxypregna - 4,6-dien-20-one product.

EXAMPLE 4

One gram of 6-chloro-16α-methyl-17α-acetoxypregna-4,6-dien-3β-ol-20-one is dispersed in 10 ml. of triethylamine at room temperature. To the resulting solution is added 5 grams of chloromethyl n-propyl ether is a portion-wise fashion with stirring. The reaction mixture is then heated to the boiling point and maintained under reflux for a period of 15 hours. After this time, the reaction mixture is poured into water and the aqueous mixture extracted with several portions of ethyl acetate. The ethyl acetate extracts are washed well with water and then evaporated to dryness. The residue obtained after evaporation is chromatographed on alumina to obtain the 3β-n-propoxylmethylenoxy - 6 - chloro-16α-methyl-17α-acetoxypregna-4,6-dien-20-one product.

EXAMPLE 5

The procedure set forth in Example 2 is repeated using 6 - chloro - 16α,17α-isopropylidenedioxypregna-4,6-dien-3β-ol-20-one, chloromethyl isobutyl ether, and lutidine to obtain the 3β - isobutoxymethylenoxy-6-chloro-16α,17α-isopropylidenedioxypregna-4,6-dien-20-one product.

EXAMPLE 6

The procedure set forth in Example 3 is repeated using 6α,7α - difluoromethylene-6β-chloro-17α-acetoxypregn-4-en-3β-ol-20-one and chloromethyl methyl ether to obtain the 3β-methoxymethylenoxy-6α,7α-difluoromethylene-6β-chloro-17α-acetoxypregn-4-en-20-one product.

EXAMPLE 7

To a solution of 10 grams of pregn-4-en-3β-ol-20-one in 150 ml. of pyridine are added 30 ml. of chloromethyl ethyl ether at 0° C. under a nitrogen atmosphere. The reaction mixture is then heated to and maintained at 70° C. for 12 hours. After this time, it is poured into ice water and extracted with methylene chloride. The methylene chloride extracts are washed with water, dried over anhydrous sodium sulfate and evaporated to dryness. The residue oil is chromatographed on washed alumina, eluting with hexane:methylene chloride (1:1) to obtain the 3β-ethoxymethylenoxypregn-4-en-20-one product.

In accordance with the foregoing methods, the following are carried out.

By reacting together 6-chloro-17α-acetoxy-19-norpregna-4,6-dien-3β-ol-20-one and chloromethyl methyl ether, there is obtained the 3β-methoxymethylenoxy-6-chloro-17α-acetoxy-19-norpregna-3,6-dien-20-one product.

By reacting together 6-fluoro-17α-acetoxypregna-4,6-dien-3β-ol-20-one and chloromethyl ethyl ether, there is obtained the 3β-ethoxymethylenoxy-6-fluoro-17α-acetoxypregna-4,6-dien-20-one product.

By reacting together 6-fluoro-17α-acetoxy-19-norpregna-4,6-dien-3β-ol-20-one and chloromethyl n-propyl ether, there is obtained the 3β-n-propoxymethylenoxy-6-fluoro-17α-acetoxy-19-norpregna-4,6-dien-20-one product.

By reacting together 6-chloro-16-methylene-17α-acetoxy-19-norpregna-4,6-dien-3β-ol-20-one and chloromethyl isopropyl ether, there is obtained the 3β-isopropoxymethylenoxy - 6-chloro-16-methylene-17α-acetoxy-19-norpregna-4,6-dien-20-one product.

By reacting together 6-fluoro-16-methylene-17α-acetoxypregna-4,6-dien-dien-3β-ol-20-one and chloromethyl n-butyl ether, there is obtained the 3β-n-butoxymethylenoxy-6 - fluoro - 16-methylene-17α-acetoxypregna-4,6-dien-20-one product.

By reacting together 6-methyl-16-methylene-17α-acetoxypregna-4,6-dien-3β-ol-20-one and chloromethyl isobutyl ether, there is obtained the 3β-isobutoxymethylenoxy - 6 - methyl-16-methylene-17α-acetoxypregna-4,6-dien-20-one product.

By reacting together 6-chloro-16α-methyl-17α-acetoxy-19-norpregna-4,6-dien-3β-ol-20-one and chloromethyl sec-butyl ether, there is obtained the 3β-sec-butoxymethylenoxy - 6 - chloro-16α-methyl-17α-acetoxy-19-norpregna-4,6-dien-20-one product.

By reacting together 6-fluoro-16α-methyl-17α-acetoxypregna-4,6-dien-3β-ol-20-one and chloromethyl t-butyl ether, there is obtained the 3β-t-butoxymethylenoxy-6-fluoro - 16α - methyl-17α-acetoxypregna-4,6-dien-20-one product.

By reacting together 6,16α-dimethyl-17α-acetoxypregna-4,6-dien-3β-ol-20-one and chloromethyl methyl ether, there is obtained the 3β-methoxymethylenoxy-6,16α-dimethyl-17α-acetoxypregna-4,6-dien-20-one product.

By reacting together 6-chloro-16α,17α-isopropylidenedioxypregna-4,6-dien-3β-ol-20-one and chloromethyl ethyl ether there is obtained the 3β-methoxymethylenoxy-6-chloro - 16α,17α - isopropylidenedioxypregna-4,6-dien-20-one product.

By reacting together 6α,7α-difluoromethylene-6β-fluoro-17α-acetoxypregn-4-en-3β-ol-20-one and chloromethyl n-propyl ether, there is obtained the 3β-n-propoxymethylenoxy - 6α,7α - difluoromethylene-6β-fluoro-17α-acetoxypregn-4-en-20-one product.

By reacting together 6α,7α-difluoromethylene-6β-methyl-17α-acetoxypregn-4-en-3β-ol-20-one and chloromethylisopropyl ether, there is obtained the 3β-isopropoxymethylenoxy - 6α,7α - difluoromethylene-6β-methyl-17α-acetoxypregn-4-en-20-one product.

By reacting together 16α-chloropregn-4-en—3β-ol-20-one and chloromethyl n-butyl ether, there is obtained the 3β-n - butoxymethylenoxy - 16α-chloropregn-4-en-20-one product.

By reacting together 16α-fluoropregn-4-ene-3β,17α-diol-20-one and chloromethyl isobutyl ether, there is obtained the 3β - isobutoxymethylenoxy-16α-fluoropregn-4-en-17α-ol-20-one product.

By reacting pregna-4,6-diene-3β,16α-diol-20-one and chloromethyl sec-butyl ether, there is obtained the 3β-sec-butoxymethylenoxypregna-4,6-dien-16α-ol-20-one product.

By reacting together 6-methyl-16α-propinoyloxy-19-norpregna-4,6-dien-3β-ol-20-one and chloromethyl t-butyl ether, there is obtained the 3β-t-butoxymethylenoxy-6-methyl - 16α-propinoyloxy-19-norpregna-4,6-dien-20-one product.

By reacting together 6β,7β-methylene-16β-methyl-19-norpregn-4-en-3β-ol-20-one and chloromethyl methyl ether, there is obtained the 3β-methoxymethylenoxy-6β,7β-methylene-16β-methyl-19-norpregn-4-en-20-one product.

By reacting together 6β,7β - dichloromethylene-17α-caproyloxypregn - 4 - on-3β-ol-20-one and chloromethyl ethyl ether, there is obtained the 3β-ethoxymethylenoxy-6β,7β - dichloromethylene-17α-caproyloxypregn-4-en-20-one product.

By reacting together 6α,7α-chloromethylene-16-methylene-19-norpregn-4-en-3β-ol-20-one and chloromethyl n-propyl ether, there is obtained the 3β-n-propoxymethylenoxy-6α,7α-chloromethylene - 16 - methylene - 19 - norpregn-4-en-20-one product.

By reacting together 6α,7α-fluoromethylene-6β-fluoro-16-methylene-17α-acetoxypregn-4-en-3β-ol - 20 - one and chloromethyl n-butyl ether, there is obtained the 3β-n-butoxymethylenoxy-6α,7α-fluoromethylene-6β-fluoro - 16-methylene-17α-acetoxypregn-4-en-20-one product.

By reacting together 6α,7α-chlorofluoromethylene-6β-chloro-16-methylene-17α-acetoxypregn-4-en - 3β - ol - 20-one and chloromethyl isobutyl ether, there is obtained the 3β-isobutoxymethylenoxy-6α,7α-chlorofluoromethylene-6β-chloro-16-methylene-17α-acetoxypregn-4 - en - 20-one product.

By reacting together 6α,7α-methylene-16-methylenepregn-4-en-3β-ol-20-one and chloromethyl sec-butyl ether, there is obtained the 3β-sec-butoxymethylenoxy-6α,7α-methylene-16-methylenepregn-4-en-20-one product.

In addition to the foregoing compounds, there can be obtained the following representative products:

3β-methoxymethylenoxy-6-fluoro-16α,17α-(2,2 - pentylidenedioxy)-pregna-4,6-dien-20-one, 3β - ethoxymethylenoxy-16α,17α-(methylphenylmethylenedioxy)-pregn-4-en-20-one, 3β-propoxymethylenoxy-6-methyl - 16α - acetoxy - 19-norpregn-4-en-17α-ol-20-one, 3β - butoxymethylenoxy-17α-propionyloxy-19-norpregna-4,6-dien-16α-ol-20-one, 3β - butoxymethylenoxy-6β,7β-difluoromethylenepregn-4-en-17α-ol-20-one, 3β - methoxymethylenoxy-6-chloro-17α-acetoxypregna-4,6-dien-20-one, 3β - methoxymethylenoxy-6-fluoro-17α-acetoxypregna-4,6-dien-20-one, 3β-methoxymethylenoxy-6-chloro-16 - methylene - 17α-acetoxypregna-4,6-dien-20-one, 3β-methoxymethylenoxy-6-fluoro-16 - methylene - 17α-acetoxypregna-4,6-dien-20-one, 3β-methoxymethylenoxy-6-chloro - 16α - methyl - 17α-acetoxypregna-4,6-dien-20-one, 3β - methoxymethylenoxy - 6 - fluoro-16α-methyl-17α-acetoxypregna-4,6-dien-20-one, 3β-methoxymethylenoxy-6-chloro - 16α,17α - isopropylidenedioxy-19-norpregna-4,6-dien-20-one, 3β - methoxymethylenoxy-6-chloro-6,7-difluoromethylene-17α-acetoxypregn-4-en-20-one, and 3β - methoxymethylenoxy-6-fluoro-6,7-difluoromethylene-17α-acetoxypregn-4-en-20-one.

What is claimed is:

1. The compound represented by the formula

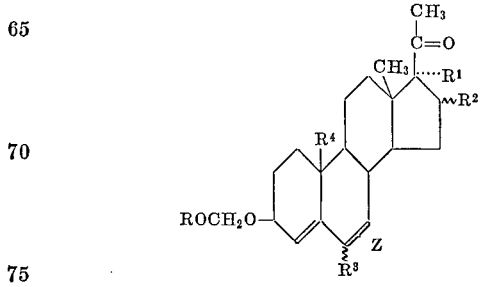

wherein R is an alkyl group containing from 1 to 4 carbon atoms, inclusive;

R¹ is hydrogen, hydroxy, or a hydrocarbon carboxylic acyloxy group of less than 12 carbon atoms;

R² is hydrogen, methylene, α-methyl, β-methyl, α-chloro, α-fluoro, α-hydroxy, α-hydrocarbon carboxylic acyloxy group of less than 12 carbon atoms, or when taken together with R¹, the group

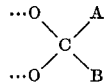

in which A is hydrogen or alkyl of up to 8 carbon atoms and B is hydrogen or alkyl or aryl of up to 8 carbon atoms;

R³ is hydrogen, chloro, fluoro or methyl;

R⁴ is hydrogen or methyl; and

Z is a carbon-carbon single bond, a carbon-carbon double bond or the group

in which each of X and Y is hydrogen, chloro or fluoro.

2. The compound claimed in claim 1 wherein R is methyl or ethyl.

3. The compound claimed in claim 1 wherein R¹ is hydroxy or a hydrocarbon carboxylic acyloxy group of less than 12 carbon atoms; R² is hydrogen, methylene, α-methyl, β-methyl or when taken together with R¹, isopropylidenedioxy; R³ is chloro, fluoro or methyl, R⁴ is hydrogen or methyl; and Z is a carbon-carbon double bond.

4. The compound claimed in claim 1 wherein R¹ is hydroxy or a hydrocarbon carboxylic acyloxy group of less than 12 carbon atoms; R² is hydrogen, methylene, α-methyl, β-methyl or, when taken together with R¹, isopropylidenedioxy; R³ is chloro or fluoro; R⁴ is methyl; and Z is the group

5. The compound claimed in claim 1 wherein R is methyl, R¹ is acetoxy; R² is hydrogen; R³ is chloro; R⁴ is methyl; and Z is a carbon-carbon double bond.

6. The compound claimed in claim 1 wherein R is methyl, R¹ is acetoxy; R² is hydrogen; R³ is fluoro; R⁴ is methyl; and Z is a carbon-carbon double bond.

7. The compound claimed in claim 1 wherein R is methyl, R¹ is acetoxy; R² is methylene; R³ is chloro; R⁴ is methyl; and Z is a carbon-carbon double bond.

8. The compound claimed in claim 1 wherein R is methyl, R¹ is acetoxy; R² is methylene; R³ is fluoro; R⁴ is methyl; and Z is a carbon-carbon double bond.

9. The compound claimed in claim 1 wherein R is methyl, R¹ is acetoxy, R² is α-methyl; R³ is chloro; R⁴ is methyl; and Z is a carbon-carbon double bond.

10. The compound claimed in claim 1 wherein R is methyl, R¹ is acetoxy, R² is α-methyl; R³ is fluoro; R⁴ is methyl; and Z is a carbon-carbon double bond.

11. The compound claimed in claim 1 wherein R is methyl, R¹ and R² taken together is isopropylidenedioxy, R³ is chloro; R⁴ is methyl; and Z is a carbon-carbon double bond.

12. The compound claimed in claim 1 wherein R is methyl, R¹ and R² taken together is isopropylidenedioxy, R³ is chloro; R⁴ is hydrogen; and Z is a carbon-carbon double bond.

13. The compound claimed in claim 1 wherein R is methyl, R¹ is acetoxy, R² is hydrogen, R³ is chloro; R⁴ is methyl; and Z is the group

14. The compound claimed in claim 1 wherein R is methyl, R¹ is acetoxy, R² is hydrogen; R³ is fluoro; R⁴ is methyl; and Z is the group

References Cited
UNITED STATES PATENTS

| | | | |
|---|---|---|---|
| 3,033,748 | 5/1962 | Wettstein et al. | 167—65 |
| 3,076,824 | 2/1963 | Harnik | 260—397.4 |
| 3,301,879 | 1/1967 | Wettstein et al. | 260—397.5 |

HENRY A. FRENCH, Primary Examiner

U.S. Cl. X.R.

260—397.4, 999

UNITED STATES PATENT OFFICE
CERTIFICATE OF CORRECTION

Patent No. 3,631,032    Dated December 28, 1971

Inventor(s) John H. Fried

It is certified that error appears in the above-identified patent and that said Letters Patent are hereby corrected as shown below:

Column 1, line 19, "are" should be -- as --.
Column 1, line 26, "3-alkoxymethyleneoxy" should be -- 3-alkoxymethylenoxy --.
Column 2, line 24, "halogen," should be -- halogeno, --.
Column 4, line 38, "is" should be -- in --.
Column 4, line 47, "propoxylmethylenoxy-" should be -- propoxymethylenoxy-, --.
Column 5, line 21, delete the second occurrence of "dien-".
Column 5, line 71, "6-methyl-16α-propinoyloxy-" should be -- 6-methyl-16α-propionyloxy- --.
Column 5, line 74, "methyl-16α-propinoyloxy-" should be -- methyl-16α-propionyloxy- --.
Column 6, line 7, "caproyloxypregn-4-on-3β-ol-20-one" should be -- caproyloxypregn-4-en-3β-ol-20-one --.

Signed and sealed this 27th day of June 1972.

(SEAL)
Attest:

EDWARD M. FLETCHER, JR.
Attesting Officer

ROBERT GOTTSCHALK
Commissioner of Patents